Feb. 7, 1967  C. F. BENSON  3,302,267
METHOD OF PRELOADING A UNIVERSAL JOINT
Original Filed July 26, 1963  3 Sheets-Sheet 1
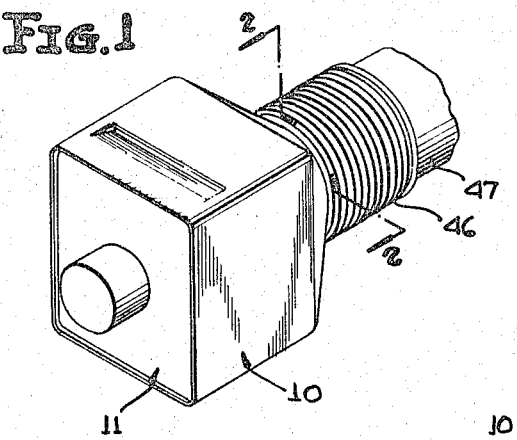
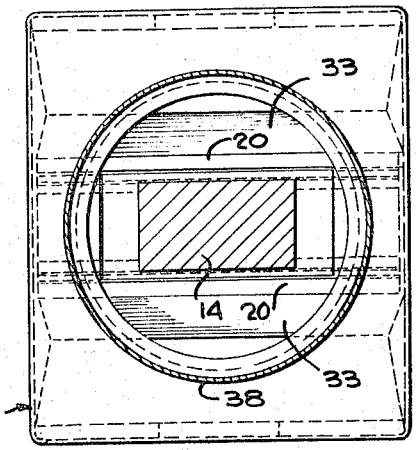
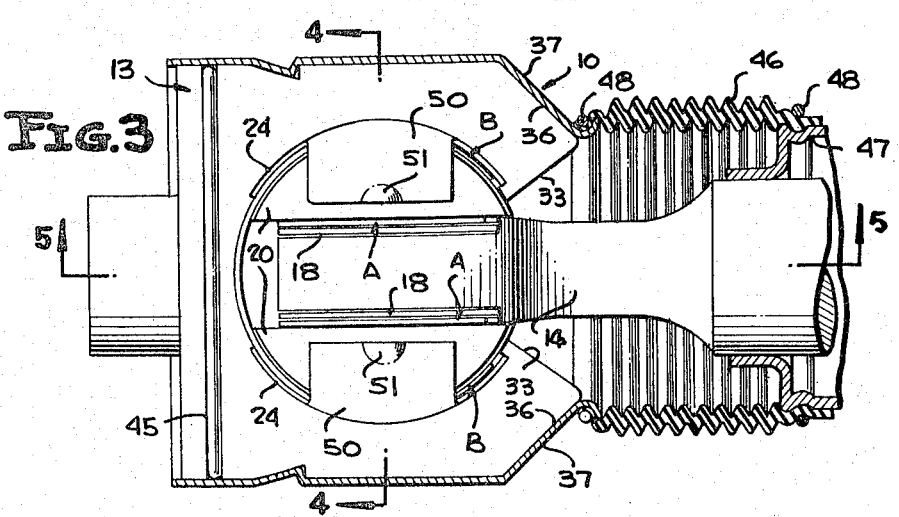
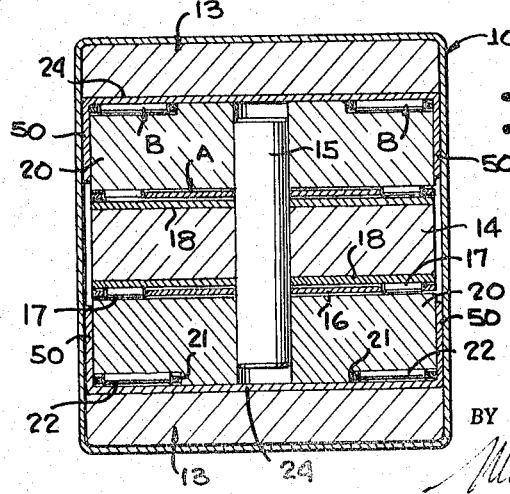
INVENTOR
CARL F. BENSON
BY
Mason, Porter, Willes & Brown
ATTORNEYS Feb. 7, 1967  C. F. BENSON  3,302,267
METHOD OF PRELOADING A UNIVERSAL JOINT
Original Filed July 26, 1963  3 Sheets-Sheet 2
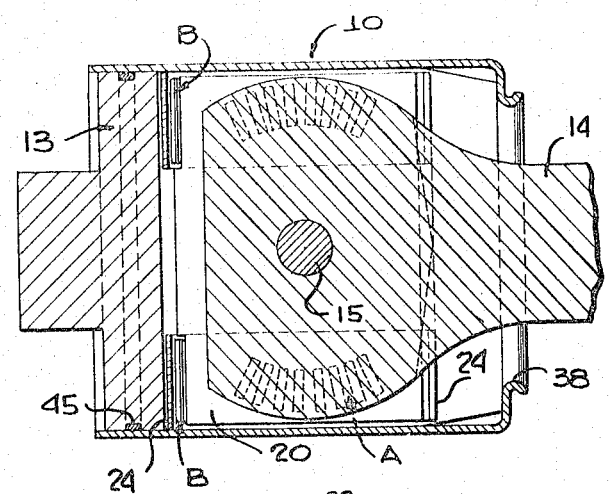
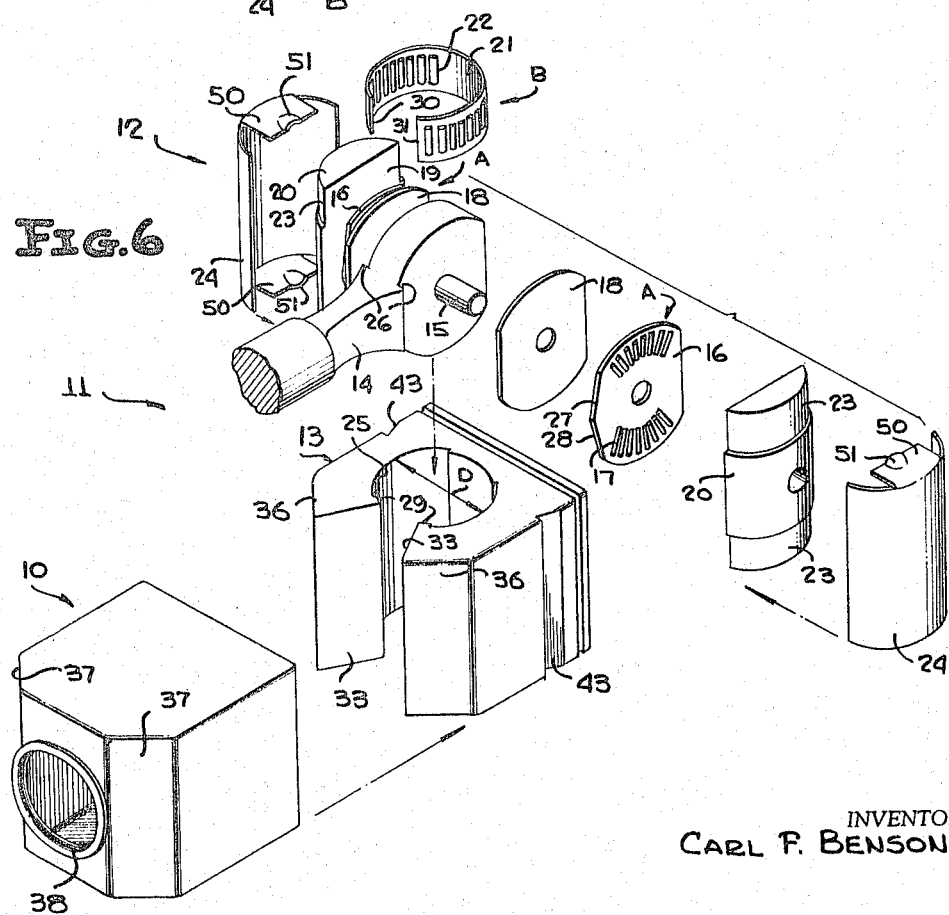
INVENTOR
CARL F. BENSON
BY
Mason, Porter, Diller & Brown
ATTORNEYS

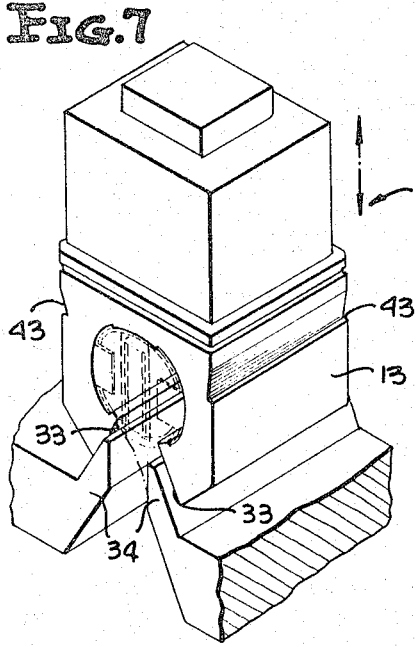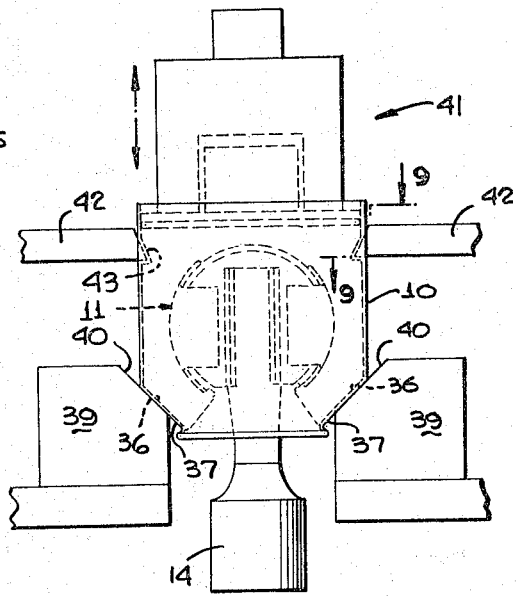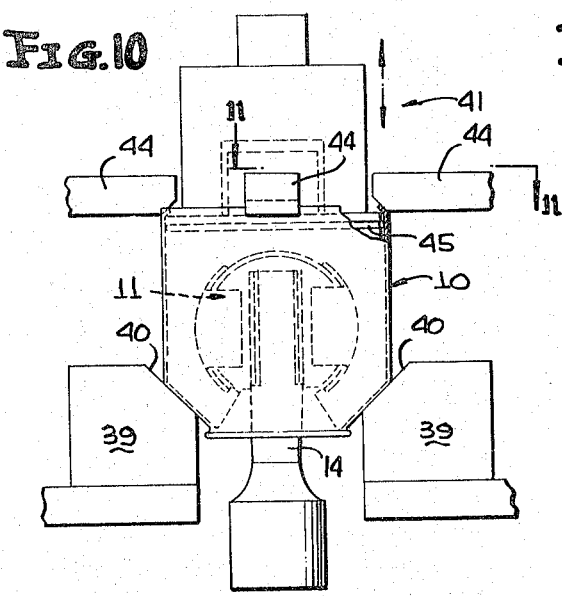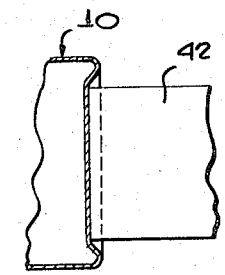

United States Patent Office 3,302,267
Patented Feb. 7, 1967

3,302,267
METHOD OF PRELOADING A UNIVERSAL JOINT
Carl F. Benson, Torrington, Conn., assignor to The Torrington Company, Torrington, Conn., a corporation of Maine
Original application July 26, 1963, Ser. No. 297,769, now Patent No. 3,217,515, dated Nov. 16, 1965. Divided and this application Sept. 20, 1965, Ser. No. 488,584
8 Claims. (Cl. 29—148.4)

This is a division of application Serial No. 297,769, filed July 26, 1963, now Patent No. 3,217,515.

This invention relates to a universal joint and more particularly to a method of making a universal joint which is provided with preloaded anti-friction elements.

Previously known universal joints, such as those of the Hookes type, have been objectionable because of lost motion, with its accompanying fretting and pounding during reversals, and during the vibration caused by the cyclical accelerations inherent in a Hookes joint. In order to assure that such a joint has a long life, it has been found necessary to reduce the load on the joint or to increase the size of the joint.

The principal object of this invention is to provide a method of making a universal joint having anti-friction roller elements and to preload the roller elements to eliminate lost motion with its accompanying fretting and pounding. Preloading of the roller elements results in obtaining added load life for a given size joint and, together with the self-aligning nature of the anti-friction elements, also results in a more even distribution of a load over all of the rollers in the anti-friction elements, as opposed to the three or four rollers which carry most of the load in the trunnion complements of the conventional cross and trunnion joint. The added load life of the universal joint, which is obtained by preloading of the anti-friction elements, may be utilized as a longer life under normal load or as equal life in a smaller overall envelope.

Accordingly, it is an object of this invention to provide a method of making a preloaded universal joint in which all play or looseness is eliminated.

Another object of this invention is to provide the preloaded universal joint with a housing encapsulating the universal joint and maintaining the preload thereon.

Another object of this invention is to provide a method of preloading a universal joint comprising the steps of assembling the paddle member and the first and second bearing means to a sub-assembly, spreading the yoke member within its elastic limit by the application of external forces, placing the sub-assembly of the paddle member and the first and second bearing means within the yoke member, and removing the external forces from the yoke member.

Another object of this invention is to provide a method of preloading the universal joint comprising the steps of assembling the paddle member and the first and second bearing means into a sub-assembly, forming the yoke member to provide cross bore surfaces spaced along an internal diameter which is smaller than the outer diameter of the sub-assembly, spreading the yoke member within its elastic limit by applying a spreading force thereto, inserting the sub-assembly into the yoke member between the cross bore surfaces, and removing the spreading force.

Another object of this invention is to include in the above-described methods, the additional step of enclosing the yoke member and the sub-assembly within a housing, and compressing the housing and the yoke member to preload the sub-assembly.

Another object of this invention is to vary the above-described methods of preloading the universal joint by omitting the steps of spreading the yoke member by designing the yoke member to receive the sub-assembly, enclosing the yoke member and the sub-assembly within a housing, and compressing the housing and the yoke member to preload the sub-assembly.

Another object of this invention is to enclose the yoke member and the sub-assembly within a housing and to connect the housing to the yoke member by crimping a section of the housing over a back edge of the yoke member.

A further object of this invention is to enclose the yoke member and the sub-assembly within a housing and to connect the housing to the yoke member by depressing portions of the housing into grooves which have been formed in the sides of the yoke member.

With the above and other objects in view that will hereinafter appear, the nature of the invention will be more clearly understood by reference to the following detailed description, the appended claimed subject matter and the several views illustrated in the accompanying drawings.

In the drawings:

FIGURE 1 is a perspective view of the novel universal joint which is the subject of this invention and specifically shows the details of the substantially rectangular encasing shell or housing.

FIGURE 2 is an enlarged transverse vertical sectional view taken on line 2—2 of FIGURE 1 and shows the paddle member protruding through a circular opening at one end of the shell or housing, which opening is considerably smaller than the cross section of the body area of the housing.

FIGURE 3 is an enlarged side elevational view of the universal joint of FIGURE 1 with the housing partly broken away and shown in section, and shows one end of the paddle member enclosed by a flexible boot and the other end of the paddle member disposed in nestled relationship with the C-shaped yoke member which is encapsulated within the housing.

FIGURE 4 is a transverse cross-sectional view of the novel universal joint, taken on line 4—4 of FIGURE 3, and shows the centrally mounted paddle member carrying the transverse guide pin upon which the pair of chordal segments are mounted with one segment on each end of the guide pin and being spaced from the paddle member by rollers which roll on raceways which are disposed adjacent to the paddle member. The figure also shows the yoke member as being separated from the chordal segments by gutter-shaped raceways and a pair of ring-type cage and roller assemblies.

FIGURE 5 is a longitudinal vertical cross-sectional view, taken on line 5—5 of FIGURE 3, and shows the details of the radial fan-shaped cage and roller assemblies which lie between the paddle member and the chordal segment.

FIGURE 6 is an exploded perspective view of the major components of the universal joint and clearly illustrates the nature of the components and the method of assembly.

FIGURE 7 is a perspective view of an assembly fixture which is used in assembling a paddle member and bearing sub-assembly within the yoke member, and shows a portion of a reciprocating ram which acts upon the yoke member and forces against a pair of stationary anvils to spread the yoke member such that the sub-assembly may be inserted therein.

FIGURE 8 is an elevational schematic view of the yoke member and the sub-assembly enclosed within the housing and illustrates one method for applying a final preload and securing the housing in place.

FIGURE 9 is a fragmentary horizontal cross-sectional view, taken along line 9—9 of FIGURE 8, and shows a tool member for depressing a portion of the housing into grooves formed in the yoke member.

FIGURE 10 is an elevational schematic view of the yoke member and the sub-assembly enclosed within the housing and illustrates an alternate method for preloading the universal joint and securing the yoke member and sub-assembly within the housing by crimping a section of the housing over a back edge of the yoke member.

FIGURE 11 is a fragmentary horizontal sectional view, with parts broken away, taken on line 11—11 of FIGURE 10, and shows a pair of crimping tools which are forced inwardly to crimp a section of the edge of the housing over the back edge of the yoke member on each of its four sides.

Referring to the drawings in detail, and in particular to the exploded view which is shown in FIGURE 6, there is shown a housing shell, generally indicated by the numeral 10, for encapsulating a universal joint, which is generally indicated by the numeral 11. The universal joint 11 includes a sub-assembly, generally indicated by the numeral 12, and a substantially C-shaped yoke member 13.

The sub-assembly 12 includes a paddle member 14 which carries a transverse guide pin 15. Angular motion in one plane normal to the axis of the guide pin 15 and about the guide pin is provided for by a pair of fan-shaped cage and roller assemblies A each including a cage 16 having a complement of radially disposed rollers 17 operating around the axis of the guide pin 15. These rollers 17 operate between a flat, heat-treated washer-like thin hardened raceway 18 and a flat face 19 of a heat-treated, chordal segment of a cylinder 20.

Angular motion about an axis disposed at right angles to the axis of the guide pin and to the median position of the axis of the paddle member 14 is provided by a pair of bearings B each including a part cylindrical roller cage 21 and a complement of rollers 22 which operate about an axis passing through the geometrical center of the cylindrical surface portions 23 of the chordal segments 20, which axis corresponds to the above-described axis. While only one cage 21 has been shown in FIGURE 6, it is to be understood that two such cages 21 are required, one above the paddle member 14, as shown, and one below (not shown). The cages 21 and the rollers 22 operate between the cylindrical portions 23 of the heat-treated segments 20 and outer heat-treated, thin gutter-shaped raceways 24.

The above-described bearing constructions obviate the necessity of heat-treating the yoke member 13 and the paddle member 14, which are major components of the universal joint, thus permitting them to be made of malleable or semi-steel castings. The guide pin 15 passes through openings in the raceways 18, the cages 16 and the segments 20 and aligns these components of the sub-assembly 12. The guide pin 15 also transmits axial loads through the chordal segments 20 to the cylindrical surface portions 23.

Assembly of the universal joint 11 is accomplished by assembling the various components of the sub-assembly 12 to the paddle member 14 and guide pin 15, including the gutter-shaped raceways 24, and sliding this sub-assembly 12 into a cross bore of the yoke member 13. Preloading of the universal joint 11 is accomplished by broaching semi-cylindrical seats 25 in the yoke member 13 to the correct radius for the reception of the gutter-shaped raceways 24, but with the distance D from seat to seat being several thousandths of an inch undersize as compared to the corresponding dimension across the outer surfaces of the raceways 24 when all of the bearing elements are properly assembled to the paddle member 14. This means that in order to place the sub-assembly 12 into the broached bore of the yoke member 13, it is necessary to spread the yoke member 13 apart.

The necessary apparatus and the method by which the spreading of the yoke member 13 is accomplished will be described later.

An important feature of this invention is that of limiting the travel of the cages 16 and the cages 21. In the case of the fan-shaped cage and roller assemblies A, referring to FIGURES 5 and 6, it will be seen that the paddle member 14 includes a pair of shoulders 26 to provide a means of angularly fixing the thin hardened raceways 18 to the paddle member 14. The cages 16 are each provided with angularly disposed edges 27 and 28 where the cages 16 abut the shoulders 26.

The angular motion of the cages 16 is approximately ½ that of the raceways 18. Thus, if the universal joint 12 is designed for a maximum deflection angle of 15° on either side of the longitudinal axis of the paddle member 14, the angular clearance provided by the edges 27 and 28 of each of the cages 16 is designed for an angular motion of 7½° on either side of their central position, before the edges 27 and 28 would strike the shoulders 26. This arrangement provides a centering action for the travel of the cages 16 and prevents the rollers 17 from travelling beyond the raceway areas provided by the raceways 18.

The part cylindrical cages 21 of the cage and roller assemblies B are likewise provided with similar limiting stops by lips 29 which are formed in the bore of the yoke member 13. The part cylindrical cages 21 have a gap between spaced edges 30 and 31. The edges 30 and 31 are spaced such that the gap in the circumference of the cages 21 is so dimensioned to allow the proper amount of angular motion on either side of the central position of the cages 21 before the edges 30 and 31 strike the lips 29.

The method and apparatus for inserting the subassembly 12 into the yoke member 13 and for preloading the universal joint 11 will now be described. A pair of internal beveled faces 33 are formed on the yoke member 13 for receiving therebetween a pair of stationary anvils 34, as is shown in FIGURE 7, which anvils match the internal beveled faces 33. A reciprocating ram tool, generally indicated by the numeral 35 and driven by suitable power means such as a hydraulic or pneumatic cylinder (not shown) is then brought to bear in a downward direction on the end of the yoke member 13 which is opposite from the beveled faces 33 until the yoke member 13 has been spread sufficiently to allow the sub-assembly 12 to be inserted easily into the bore of the yoke member 13. The ram tool 35 is then withdrawn and the yoke member 13 is permitted to close back upon the sub-assembly 12. The dimension D between the cross bore surfaces 25, as is shown in FIGURE 6, is smaller than the dimension across the assembled raceways 24. The exact size to make dimension D may be calculated theoretically but it would be easier and more satisfactory to establish this dimension by experiment. The dimension D should be made sufficiently small to produce an appreciable preload across the sub-assembly 12 when the universal joint 11 is removed from the stationary anvils 34.

The housing 10, which is preferably constructed in the form of a deep drawn shell of heavy gauge low carbon steel, provides several desirable features in addition to merely enclosing the universal joint 11. The housing 10 not only encapsulates the universal joint 11 to retain lubricant and to exclude dirt, but is also designed for increasing and/or maintaining the preload on the universal joint 11. The yoke member 13 is provided with a pair of external beveled faces 36 adjacent to the end thereof which has been provided with the internal beveled faces 33. The housing 10 is provided with tapered end walls 37 to match the external beveled faces 36. The housing 10 is pushed over the assembled universal joint 11 and the paddle member 14 protrudes outwardly through a circular opening 38 which is disposed between the tapered end walls 37.

The housing 10, after being pushed over the assembled universal joint 11, is then placed in a final preload-and-staking fixture. This is shown in FIGURES 8 through 11 in which two alternative methods of staking are illustrated. In both methods the housing 10, with the universal joint 11 therein, is placed upon a pair of stationary anvils 39 which are provided with beveled faces 40 that conform to the tapered end walls 37. A reciprocating ram, generally indicated by the numeral 41, which is driven by a suitable controllable means such as a hydraulic or pneumatic cylinder, is then brought to bear in a downward direction on the then upper surface of the yoke member 13 which is inside of the housing 10. The pressure on the ram 41 will drive the external beveled faces 36, on the lower end of the yoke member 13, downwardly against the correspondingly tapered end walls 37 in the housing 10. This will result in lateral force components which will compress the yoke member 13 to increase the preload on the sub-assembly 12. The pressure of the ram 41 should be adjusted to the point where the preload on the universal joint 11 approaches the static load capacity of the bearing sub-assembly 12.

At this point the ram pressure is stabilized and the housing 10 is staked in position on the yoke member 13. Two alternative staking arrangements are illustrated. In FIGURES 8 and 9 two staking tools 42 are forced laterally against opposite sides of the housing 10 to depress the housing 10 into a pair of grooves 43 which have been formed into the sides of the yoke member 13, such as by broaching.

In FIGURES 10 and 11 there is illustrated the other type of staking arrangement. Four crimping tools 44 are shown which are forced inwardly to crimp a section of the edge of the housing 10 over the back edge of the yoke member 13 on each of its four sides.

Another feature of the present invention is illustrated in FIGURE 6. Each of the gutter-shaped hardened raceways 24 is provided with inwardly turned top and bottom end members 50. Each of the end members 50 has a slight bump or crown 51 formed therein. The crowns 51 provide a resiliency which serves to remove any looseness between the segments 20 and the end members 50 of the raceways 24 and the housing 10 after the housing 10 is positioned around the universal joint 11.

An O-ring 45 is shown inserted in a groove around the yoke member 13. The O-ring is designed to provide a seal when the housing 10 is pushed over the yoke member 13 to prevent lubricant from leaking out in this area. The circular opening 38 at the bottom end of the housing 10 is considerably smaller than the cross-section of the body area of the housing 10. During operation, centrifugal force will tend to throw lubricant into the larger cross-section area and effectively retain the lubricant around and within the bearing sub-assembly 12. A flexible boot 46, as is shown in FIGURE 3, is connected between the housing 10 and a retainer ring 47 on the paddle member 14 by a pair of suitable snaprings 48. The flexible boot 46 prevents foreign material from entering within the housing 10 and results in a completely sealed unit.

It is apparent from the foregoing description that there has been disclosed a novel preloaded universal joint which has incorporated therein various desirable features. The preloading of the universal joint distributes the loads over a greater number of roller elements and greatly diminishes the fretting and vibrational loads which are inevitable during the cyclical angular accelerations in a Hookes type joint, when even a small amount of play is present. Preloading of the universal joint, as above described, will consequently provide longer and more satisfactory life for the universal joint.

While preferred forms and arrangement of parts have been shown in illustrating the invention, it is to be clearly understood that various changes in the disclosed methods of assembly, details and arrangement of parts may be made without departing from the spirit and scope of the invention, as defined in the appended claimed subject matter.

I claim:

1. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly, spreading the yoke member to stress it within its elastic limit by the application of external forces, placing the sub-assembly of said paddle member and said first and second bearing means within said yoke member, removing the external forces from said yoke member for subjecting said sub-assembly to compressive forces exerted by said stressed yoke member and maintaining said compressive forces for holding said universal joint in a preloaded condition.

2. A method of preloading a univesral joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly having a predetermined outer diameter, machining said yoke member to provide cross bore surfaces spaced along an internal diameter which is smaller than said predetermined outer diameter of said sub-assembly, spreading the yoke member within its elastic limit by applying a spreading force thereto, inserting said sub-assembly into said yoke member between said cross bore surfaces, and removing said spreading force whereby said sub-assembly is subjected to compressive forces by said yoke member.

3. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly, spreading the yoke member within its elastic limit by the application or external forces, placing the sub-assembly of said paddle member and said first and second bearing means within said yoke member, removing the external forces from said yoke member, enclosing said yoke member within a housing, and compressing said housing and said yoke member to preload said sub-assembly.

4. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly having a predetermined outer diameter, machining said yoke member to provide cross bore surfaces spaced along an internal diameter which is smaller than said predetermined outer diameter, spreading the yoke member within its elastic limit by applying a spreading force thereto, inserting said sub-assembly into said yoke member between said cross bore surfaces, and removing said spreading force, enclosing said yoke member within a housing, and compressing said housing and said yoke member to preload said sub-assembly.

5. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly placing the sub-assembly within said yoke member, enclosing said yoke member within a housing, compressing said housing and said yoke member for preloading said first and second bearing means, and fixing said housing in its compressed condition for maintaining a preload on said sub-assembly.

6. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly having a predetermined outer diameter, machining said yoke member to provide cross bore surfaces spaced along an internal diameter which is smaller than said predetermined outer diameter, inserting said sub-assembly into said yoke member between said cross bore surfaces, enclosing said yoke member within a housing, and compressing said housing and said yoke member for preloading said first and second bearing means.

7. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly, placing the sub-assembly within said yoke member, enclosing said yoke member within a housing and compressing said housing and said yoke member by the use of external forces for providing a preload on said sub-assembly, maintaining the compression of said housing and yoke member and crimping a section of said housing over a back edge of said yoke member.

8. A method of preloading a universal joint of the type comprising a yoke member and a paddle member and including first bearing means for providing pivotal movement between said yoke member and said paddle member about a transverse axis of the paddle member, and second bearing means for providing pivotal movement between said yoke member and said paddle member about an axis normal to said transverse axis; said method comprising the steps of assembling said paddle member and said first and second bearing means into a sub-assembly, placing the sub-assembly within said yoke member, enclosing said yoke member within a housing and compressing said housing and said yoke member by the use of external forces for providing a preload on said sub-assembly, maintaining the compression of said housing and yoke member and depressing portions of said housing into grooves which have been formed in the sides of said yoke member.

References Cited by the Examiner

UNITED STATES PATENTS

| | | | |
|---|---|---|---|
| 1,101,996 | 6/1914 | Carter et al. | 64—16 |
| 1,300,733 | 4/1919 | Keller | 64—8 |
| 1,322,250 | 11/1919 | Lewis | 29—470.5 |
| 1,348,166 | 8/1920 | Garman | 64—7 |
| 2,112,439 | 3/1938 | Graff et al. | 220—67 |
| 2,213,448 | 9/1940 | Morton | 29—438 |
| 2,238,335 | 4/1941 | MacGregor | 29—438 X |
| 2,621,088 | 12/1952 | Cole | 29—453 X |
| 2,624,907 | 1/1953 | Graham | 29—453 X |
| 2,867,358 | 1/1959 | Meshberg | 29—511 X |
| 2,977,824 | 4/1961 | Rueb | 29—453 X |
| 3,217,515 | 11/1965 | Benson | 64—7 |

JOHN F. CAMPBELL, *Primary Examiner.*

THOMAS H. EAGER, *Examiner.*